US012633582B2

(12) United States Patent
Woo et al.

(10) Patent No.: US 12,633,582 B2
(45) Date of Patent: May 19, 2026

(54) DEFORMATION ANALYSIS DEVICE AND METHOD FOR SECONDARY BATTERY

(71) Applicants: SAMSUNG SDI CO., LTD., Yongin-si (KR); UNIST (Ulsan National Institute of Science and Technology), Ulsan (KR)

(72) Inventors: Seong Ho Woo, Yongin-si (KR); Dae Sik Kim, Yongin-si (KR); Sung Kook Lee, Yongin-si (KR); Ji Young Kim, Yongin-si (KR); Bo Ram Lee, Yongin-si (KR); Hyun-Wook Lee, Ulsan (KR); Changhyun Park, Ulsan (KR); Ukhyun Jung, Ulsan (KR)

(73) Assignees: SAMSUNG SDI CO., LTD., Yongin-si (KR); UNIST (Ulsan National Institute of Science and Technology), Ulsan (KR)

( * ) Notice: Subject to any disclaimer, the term of this patent is extended or adjusted under 35 U.S.C. 154(b) by 268 days.

(21) Appl. No.: 18/594,464

(22) Filed: Mar. 4, 2024

(65) Prior Publication Data

US 2024/0386544 A1 Nov. 21, 2024

(30) Foreign Application Priority Data

May 15, 2023 (KR) ......................... 10-2023-0062215

(51) Int. Cl.
| | |
|---|---|
| *H01M 10/42* | (2006.01) |
| *G06T 7/00* | (2017.01) |
| *H01M 10/04* | (2006.01) |

(52) U.S. Cl.
CPC ....... *H01M 10/4285* (2013.01); *G06T 7/0006* (2013.01); *H01M 10/0422* (2013.01);
(Continued)

(58) Field of Classification Search
CPC .............. G01R 31/392; G06T 7/0006; H01M 10/0422; H01M 10/0431; H01M 10/425;
(Continued)

(56) References Cited

U.S. PATENT DOCUMENTS

2024/0021882 A1* 1/2024 Yoon ................. H01M 10/0422

FOREIGN PATENT DOCUMENTS

| | | |
|---|---|---|
| EP | 4235889 A1 | 8/2023 |
| JP | 2020-080250 A | 5/2020 |

(Continued)

*Primary Examiner* — David J Makiya
*Assistant Examiner* — Miya Downing
(74) *Attorney, Agent, or Firm* — Lee IP Law, P.C.

(57) ABSTRACT

A deformation analysis device and a non-destructive analysis method for a secondary battery are capable of accurately diagnosing electrode deformation of the secondary battery using a computed tomography (CT) image. The deformation analysis method for the secondary battery includes performing computed tomography (CT) scanning on each of a first area and a second area of the secondary battery to acquire a first image corresponding to the first area and a second image corresponding to the second area, measuring a first angle from a winding front end to a winding distal end of an electrode of an electrode assembly in the first image and measuring a second angle from the winding front end to the winding distal end of the electrode of the electrode assembly in the second image, and determining that the electrode assembly is deformed if a difference value between the first angle and the second angle is greater than a reference value.

20 Claims, 5 Drawing Sheets

(52) U.S. Cl.
CPC .................. *H01M 10/0431* (2013.01); *G01N 2223/1016* (2013.01); *G01N 2223/401* (2013.01); *G01N 2223/419* (2013.01); *Y02E 60/10* (2013.01); *Y02P 70/50* (2015.11)

(58) Field of Classification Search
CPC ............. H01M 10/4285; H01M 10/48; H01M 2010/4278
See application file for complete search history.

(56) References Cited

FOREIGN PATENT DOCUMENTS

| | | | |
|---|---|---|---|
| KR | 10-1334121 | B1 | 11/2013 |
| KR | 10-2022-0111363 | A | 8/2022 |
| WO | WO 2023/080503 | A1 | 5/2023 |

* cited by examiner

1

20

30

31   32   33

First area
(upper portion)

10

Second area
(lower portion)

DEFORMATION ANALYSIS DEVICE AND METHOD FOR SECONDARY BATTERY

CROSS-REFERENCE TO RELATED APPLICATION

Korean Patent Application No. 10-2023-0062215, filed on May 15, 2023, in the Korean Intellectual Property Office, is incorporated herein by reference in its entirety.

BACKGROUND

1. Field

Embodiments relate to a deformation analysis device and method thereof for a secondary battery.

2. Description of the Related Art

In secondary batteries, various electrochemical reactions occur inside the batteries due to continuous charging and discharging that result in battery deterioration and performance degradation. In particular, internal deformation of a battery, which occurs during charging and discharging, is a major factor causing deterioration and performance degradation. In order to analyze this deterioration phenomenon, a destructive analysis method that requires disassembly of a battery in order to conduct the analysis is generally used. However, this analysis method inevitably causes damage to the inside of the battery during the disassemble process and makes it difficult to identify the actual causes of performance degradation. Accordingly, such destructive methods for analysis are limited in their utility and reliability for confirming the tendency of deterioration as charging and discharging progresses.

SUMMARY

Embodiments are directed to a deformation analysis method for a secondary battery having an electrode assembly in a case, the deformation analysis method including performing computed tomography (CT) scanning on each of a first area and a second area of the secondary battery to acquire a first image corresponding to the first area and a second image corresponding to the second area, measuring a first angle from a winding front end to a winding distal end of an electrode of an electrode assembly in the first image and measuring a second angle from the winding front end to the winding distal end of the electrode of the electrode assembly in the second image, and determining that the electrode assembly is deformed if a difference value between the first angle and the second angle is greater than a reference value.

In an implementation, the secondary battery has a cylindrical shape.

In an implementation, the electrode assembly has a positive electrode plate, a separator, and a negative electrode plate, in stacked configuration and is wound in a cylindrical shape.

In an implementation, the winding front end and the winding distal end are a winding front end and a winding distal end of the positive electrode plate or a winding front end and a winding distal end of the negative electrode plate.

In an implementation, the first and second areas are spaced apart from each other in a direction perpendicular to a winding axis of the electrode assembly.

In an implementation, the first area comprises an upper area adjacent to an upper end of the secondary battery and the second area comprises a lower area adjacent to a lower end of the secondary battery.

In an implementation, each of the first and second angles is an angle between a first straight line corresponding to a radius from the winding front end to a center of the electrode assembly and a second straight line corresponding to a radius from the winding distal end to the center of the electrode assembly.

In an implementation, the reference value ranges from about 1° to about 20°.

In an implementation, the method is repeated according to a number of times charge/discharge cycles of the secondary battery is performed.

In embodiments, the deformation analysis method further includes determining that the electrode assembly is deformed if at least one of the first angle or the second angle is greater than the reference value as each charge/discharge cycle of the secondary battery elapses.

Embodiments are also directed to a deformation analysis device for a secondary battery, in which an electrode assembly is in a case, the deformation analysis device having a control circuit, a processor installed in the control circuit, and a memory installed in the control circuit and operably connected to the processor, wherein the processor is configured to execute a program code stored in the memory so as to perform an operation of performing computed tomography (CT) scanning on each of a first area and a second area of the secondary battery to acquire a first image corresponding to the first area and a second image corresponding to the second area, an operation of measuring a first angle from a winding front end to a winding distal end of an electrode of an electrode assembly in the first image and measuring a second angle from the winding front end to the winding distal end of the electrode of the electrode assembly in the second image, and an operation of determining that the electrode assembly is deformed if a difference value between the first angle and the second angle is greater than a reference value.

In an implementation, the secondary battery has a cylindrical shape.

In an implementation, the electrode assembly has a positive electrode plate, a separator, and a negative electrode plate, in stacked configuration and is wound in a cylindrical shape.

In an implementation, the winding front end and the winding distal end are a winding front end and a winding distal end of the positive electrode plate or a winding front end and a winding distal end of the negative electrode plate.

In an implementation, the first and second areas are spaced apart from each other in a direction perpendicular to a winding axis of the electrode assembly.

In an implementation, the first area comprises an upper area adjacent to an upper end of the secondary battery and the second area comprises a lower area adjacent to a lower end of the secondary battery.

In an implementation, each of the first and second angles is an angle between a first straight line corresponding to a radius from the winding front end to a center of the electrode assembly and a second straight line corresponding to a radius from the winding distal end to the center of the electrode assembly.

In an implementation, the reference value ranges from about 1° to about 20°.

In an implementation, the method is repeated according to a number of times charge/discharge cycles of the secondary battery is performed.

In embodiments, the processor is further configured to include an operation of determining that the electrode assembly is deformed if at least one of the first angle or the second angle is greater than the reference value as each charge/discharge cycle of the secondary battery elapses.

Aspects of some embodiments of the present disclosure provide a deformation analysis device and method for a secondary battery, which are capable of accurately diagnosing electrode deformation of the secondary battery using a computed tomography (CT) image, which is a non-destructive analysis method.

BRIEF DESCRIPTION OF THE DRAWINGS

Features will become apparent to those of skill in the art by describing in detail exemplary embodiments with reference to the attached drawings, in which.

DETAILED DESCRIPTION

Figure 1:
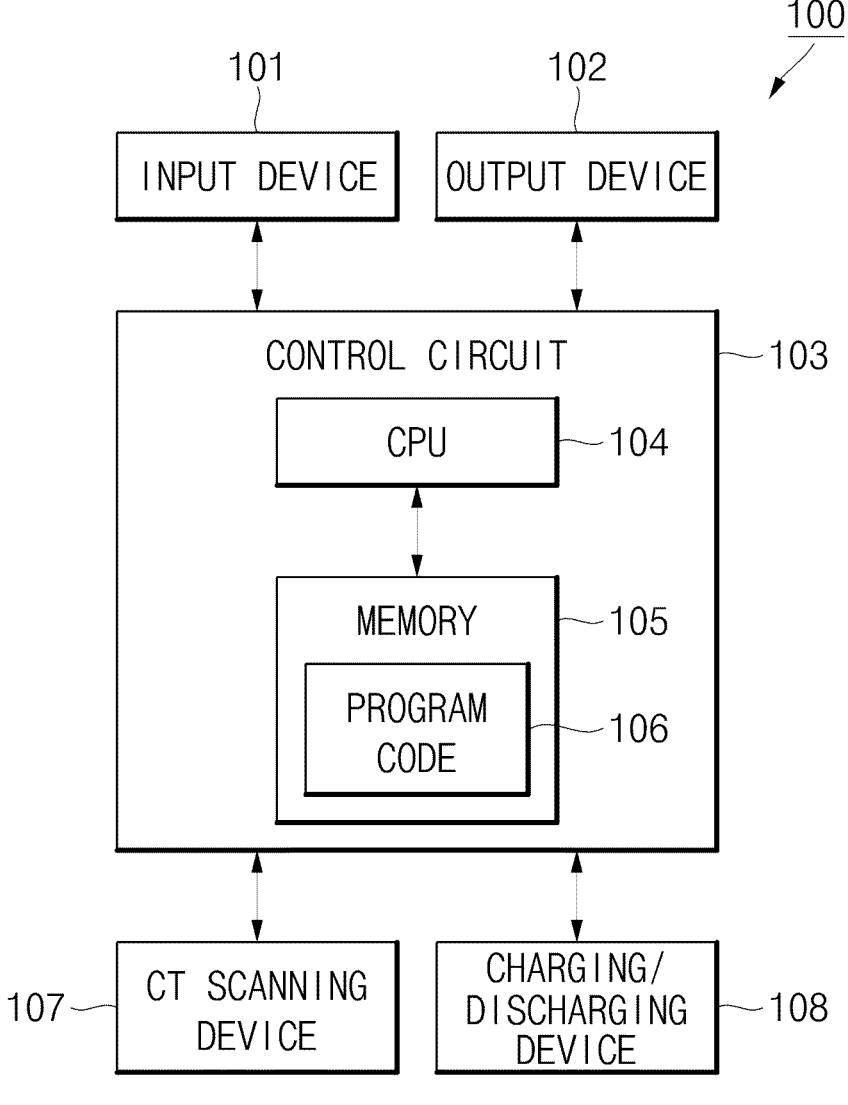
FIG. 1 is a block diagram illustrating a configuration of a deformation analysis device for a secondary battery according to embodiments.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the figures, like reference numerals refer to like elements throughout. As used herein, the term "and/or" includes any and all combinations of one or more of the associated listed items. The terms used in this specification are for illustrative purposes of the present disclosure only and should not be construed to limit the meaning or the scope of the present disclosure. As used in this specification, a singular form may, unless definitely indicating a particular case in terms of the context, include a plural form. Also, the expressions "comprise" and/or "comprising" used in this specification neither define the mentioned shapes, numbers, processes, operations, members, elements, and/or groups of these, nor exclude the presence or addition of one or more other different shapes, numbers, processes, operations, members, elements, and/or groups of these, or addition of these. The term "charging/discharging" used herein is equivalent to the term "charge/discharge."

In addition, a control circuit and/or other related devices or components according to the present disclosure may be implemented using any suitable hardware, firmware (e.g., application-specific semiconductor), software, or a suitable combination of software, firmware, and hardware. For example, various components of the control circuit and/or other related devices or parts according to the present disclosure may be formed on one integrated circuit chip or a separate integrated circuit chip. In some embodiments, various components of the control circuit may be implemented on a flexible printed circuit film and may be formed on a tape carrier package, a printed circuit board, or a substrate that is the same as the control circuit. In some embodiments, various components of the control circuit may be processors or threads, which are executed in one or more processors, in one or more computing devices, and it may execute computer program instructions and interact with other components to perform various functions discussed below. The computer program instructions may be stored in memory that is capable of being executed in the computing device using standard memory device such as, for example, random access memory. The computer program instructions may also be stored in other non-transitory computer readable media such as, for example, a CD-ROM, flash drive or the like. In some embodiments, those skilled in the art related to the present disclosure should be recognized that the functions of various computing devices are combined with each other or incorporated into one computing device, or the functions of a particular computing device are dispersed in one or more other computing devices without departing from the exemplary embodiments of the present disclosure.

FIG. 1 is a block diagram illustrating a configuration of a deformation analysis device 100 for a secondary battery according to embodiments. As illustrated in FIG. 1, a deformation analysis device 100 for a secondary battery according to embodiments may include an input device 101, an output device 102, a control circuit 103, a central processing unit (CPU) 104, a memory 105, and a program code 106. In some embodiments, the deformation analysis device 100 for the secondary battery according to embodiments may further include a CT scanning device 107 and/or a charging/discharging device 108.

The control circuit 103 may execute the program code 106 stored in the memory 105 through the CPU 104 and thus control an overall operation of the deformation analysis device 100. In some embodiments, the program code 106 may include an image analysis tool such as "Image J", which is capable of being downloaded free of charge from a website (imagej.net).

The deformation analysis device 100 may receive data or information input by a user through the input device 101 such as a keyboard or mouse and may output an image or sound through the output device 102 such as a monitor or speaker. In some embodiments, the deformation analysis device 100 may directly or indirectly receive a CT image from the CT scanning device 107. In some embodiments, the deformation analysis device 100 may directly or indirectly receive the number of times of a charging/discharging cycle from the charging/discharging device 108. In some embodiments, the deformation analysis device 100 may receive paired data of the CT image and the number of times of the charging/discharging cycle.

The memory 105 may store various set values (e.g., reference values) for implementing the present disclosure, the received CT image, the number of times of the received charging/discharging cycle, and the program code 106 for controlling the operation of the deformation analysis device 100.

The CT scanning device 107 may acquire a first image corresponding to a first area and a second image corresponding to a second area by performing CT scanning of the first area of the secondary battery and the second area spaced apart from the first area to directly or indirectly transmit the acquired first and second images to the deformation analysis device 100.

In some embodiments, the CT scanning device 107 may be controlled by the direct control of the control circuit 103, and thus, the control circuit 103 may directly acquire or receive the first and second images from the CT scanning device 107. In some embodiments, the first and second images acquired from the CT scanning device 107 may be indirectly provided to the control circuit 103 through the input device 101.

The charging/discharging device 108 may provide current and a voltage to the secondary battery to be CT-scanned to charge the secondary battery or may connect a load to the secondary battery to discharge the secondary battery.

In some embodiments, the charging/discharging device 108 may be controlled by the direct control of the control circuit 103, and thus, the control circuit 103 may directly acquire or receive the number of times of the charging/discharging cycle from the charging/discharging device 108. In some embodiments, the number of times of the charging/discharging cycle acquired from the charging/discharging device 108 may be indirectly provided to the control circuit 103 through the input device 101.

In some embodiments, the first and second images for each number of times of the charging/discharging cycle of the secondary battery may be provided to the control circuit 103 in the form of mutually matched data. In some embodiments, whenever the charging/discharging cycle of the secondary battery elapses, the CT scanning may be performed on the first and second areas of the secondary battery, and thus, the data including the number of times of the charging/discharging cycle and the first and second images may be directly or indirectly provided to the control circuit 103.

Figure 2:
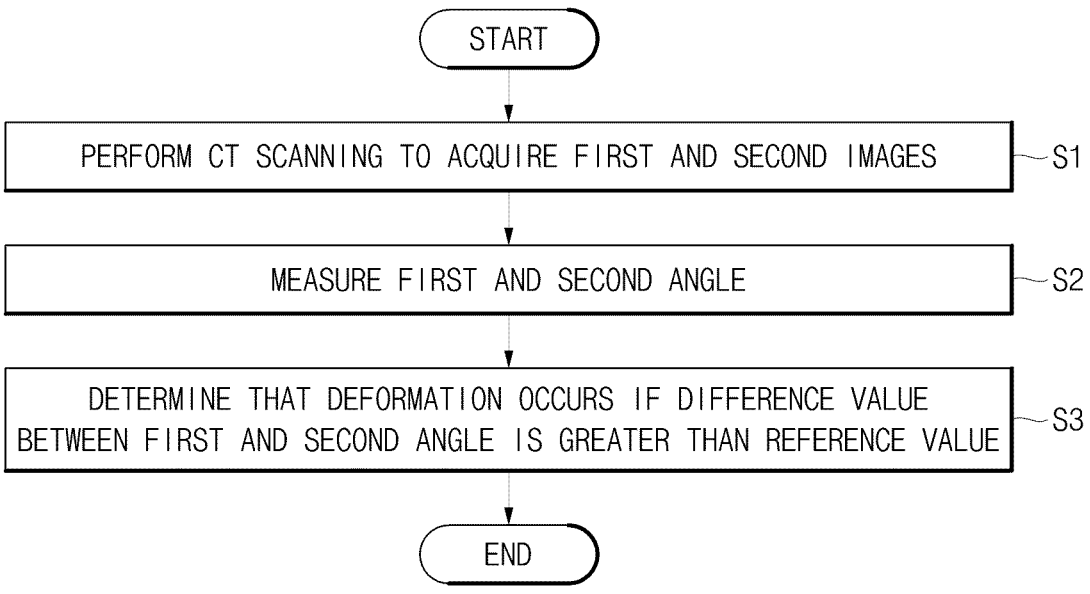
FIG. 2 is a flowchart illustrating a deformation analysis method for a secondary battery according to embodiments.

FIG. 2 is a flowchart illustrating a deformation analysis method for a secondary battery according to embodiments. As illustrated in FIG. 2, a deformation analysis method for a secondary battery according to embodiments may include a first process (S1) of CT-scanning the secondary battery to acquire first and second images, a second process (S2) of measuring first and second angles from the first and second images, and a third process (S3) of determining the measured value as deformation of the secondary battery if a difference value between the first and second angles is greater than a reference value.

In the first process (S1), a control circuit 103 may acquire or receive a first image and a second image from a CT scanning device 107. In some embodiments, each of the first area and the second area of the secondary battery may be CT-scanned by the CT scanning device 107, and a first image corresponding to the first area and a second image corresponding to the second area may be transmitted to the control circuit 103 from the CT scanning device 107. As described above, the CT scanning device 107 may operate by a control signal of the control circuit 103 or may operate independently to directly or indirectly transmit the first and second images to the control circuit 103.

In the second process (S2), the control circuit 103 may measure a first angle from a winding front end of an electrode of an electrode assembly to a winding distal end (or end) on the first image and may measure a second angle from the winding front end of the electrode of the electrode assembly to the winding distal end on the second image.

In the third process (S3), if the difference value between the first and second angles is greater than the preset reference value, the control circuit 103 may determine the measured value as the case in which deformation occurs in the electrode assembly of the secondary battery. In some embodiments, the control circuit 103 may output the first and second images, the first and second angles, the difference value between the first and second angles, the reference value, and whether the deformation occurs through the output device 102.

Hereinafter, the deformation analysis method of the secondary battery according to the present disclosure will be described in more detail.

[Preparation of Secondary Battery]

First, a cylindrical secondary battery in which a jelly-roll-shaped electrode assembly is accommodated in a cylindrical case (or a cylindrical can) may be prepared.

Figure 3A:
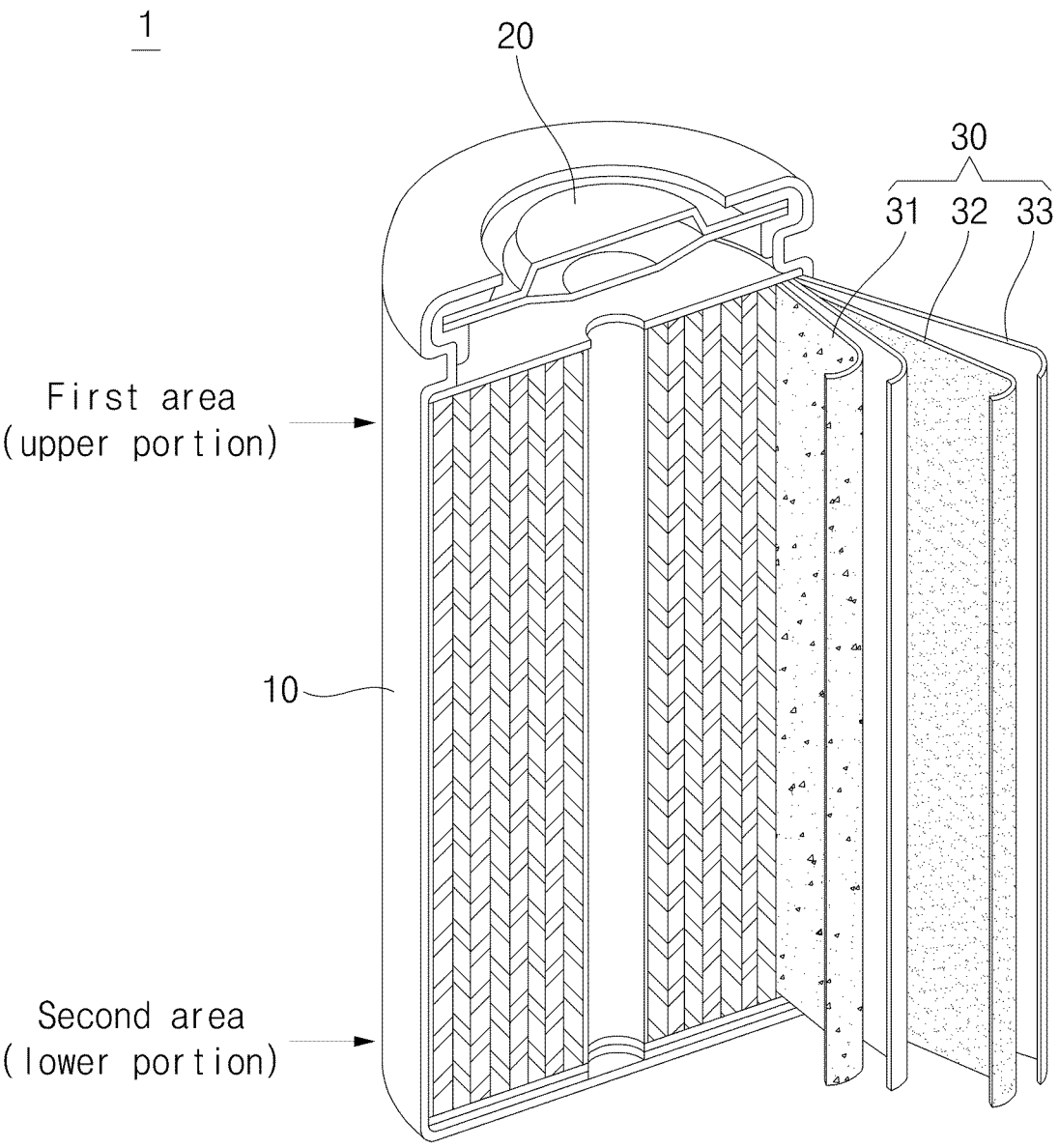
FIGS. 3a and 3b are a longitudinal cross-sectional view and a transverse cross-sectional view of a secondary battery according to embodiments.
Figure 3B:
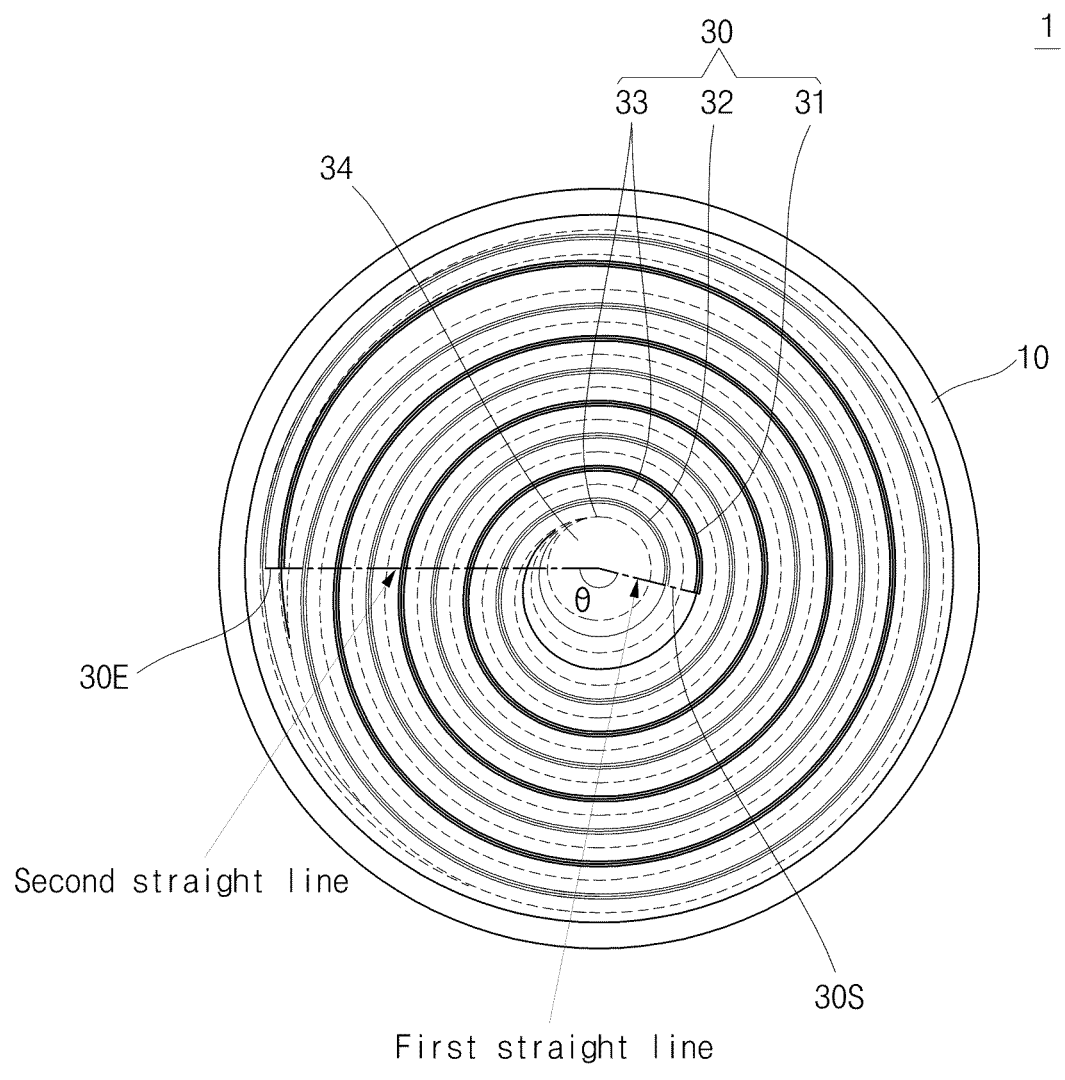

FIGS. 3*a* and 3*b* are a longitudinal cross-sectional view and a transverse cross-sectional view of a secondary battery according to embodiments. In some embodiments, FIG. 3*b* is illustrated to be significantly exaggerated so as to explain a winding state of the electrode assembly. In fact, a center of the electrode assembly has an approximately circular empty space (or core), and there is almost no empty space between the outside of the electrode assembly and an inner surface of the case (or can). In some embodiments, the electrode assembly is wound close to a perfect circle, and FIG. 3*b* is illustrated to be exaggerated so as to explain the winding structure as described above. In some embodiments, those skilled in the art will appreciate that the CT image corresponding to FIG. 3*b* is opposite to the shading in FIG. 3*b*.

In some embodiments, in the secondary battery 1, after a jelly-roll type electrode assembly 30 is accommodated in the cylindrical can 10, and an electrolyte is injected so that the electrode assembly 30 is immersed in the cylindrical can 10 (option), the cap assembly 20 may be coupled to an opened upper end of the cylindrical can 10 so as to be manufactured. In some embodiments, the electrode assembly 30 may have a jelly-roll shape manufactured by stacking a positive electrode 31 and a negative electrode 32 with a separator 33 therebetween and then winding the positive electrode 31, the negative electrode 32, and the separator 33 in one direction. In FIG. 3*b*, the reference symbol 30S denotes a winding front end area of the electrode assembly 30 at which the winding begins, and the reference symbol 30E denotes a winding distal end area of the electrode assembly 30 at which the winding is finished. if the positive electrode, the negative electrode, the separator, the electrolyte, and the like are well known to those skilled in the art, detailed descriptions thereof will be omitted.

In some embodiments, the cylindrical can 10 may be made of a metal such as steel or stainless steel. In some embodiments, the cylindrical can may include an accommodation part in which the electrode assembly is accommodated and may have an opened upper end. In some embodiments, the opened upper end of the cylindrical can 10 may be provided with a beading part that is bent so that the cap assembly 20 is sealed after being coupled, and a clamping part of which an upper end is bent to fix the cap assembly 20. In some embodiments, the beading part may be provided at a contact portion between a cap assembly and the cylindrical can and may have a shape recessed toward the inside of the cylindrical can. In some embodiments, the cylindrical can may serve as a negative electrode terminal for connection to an external circuit. In some embodiments, the cap assembly 20 may have a structure in which a cap-up, a safety vent, and the like are in close contact with a gasket for sealing, which is mounted in a space defined in the clamping part and an upper inner surface of the crimping part of the cylindrical can 10. A central portion of the cap-up may protrude upward to serve as a positive electrode terminal for the connection to the external circuit. In some embodiments, an empty core 34 may be provided at the central portion of the electrode assembly 30 wound in the jelly-roll shape. In some embodiments, a center pin (not shown), which is made of a cylindrical metal material for imparting predetermined strength to the electrode assembly, may be inserted into the core 34, and in some cases, the electrode may be welded to the cylindrical can or cap assembly, and then, the center pin may be removed. In some embodiments, a negative electrode tab may protrude from the bottom of the electrode assembly and be welded to the bottom surface of the cylindrical can, and a positive electrode tab may protrude from an upper end of the electrode assembly and be welded to the cap assembly.

In some embodiments, a CT scanning area of the secondary battery 1 may include a first area adjacent to the cap assembly and a second area adjacent to a bottom surface of the can. In some embodiments, the first area may be an approximately upper area of the electrode assembly, and the second area may be approximately a lower area of the electrode assembly. In some embodiments, the CT scanning area may further include a third area, which may be approximately an intermediate area of the electrode assembly.

The cylindrical secondary battery described herein is only an example for understanding the present disclosure, and the present disclosure is not limited to the cylindrical secondary battery. For example, the present disclosure may be applied to a 18650 (diameter of about 18 mm, height of about 65 mm) cylindrical battery, a 21700 (diameter of about 21 mm, height of about 70 mm) cylindrical battery, or a 4680 (diameter of about 46 mm, height of about 80 mm) cylindrical battery and also may be applied to any cylindrical battery made going forward into the future.

[CT Scanning]

If the cylindrical secondary battery is prepared as described above, an image of a cross-section perpendicular to a winding axis of the electrode assembly may be acquired by the CT scanning device. As described above, the images may include a first image obtained by scanning the first area (e.g., the upper area of the electrode assembly) of the secondary battery and a second image obtained by scanning the second area (e.g., the lower area of the electrode assembly) of the secondary battery. In some embodiments, the first image may be an image of the first area perpendicular to the winding axis (upper area), and the second image may be an image of the second area perpendicular to the winding axis (lower area).

In some embodiments, such image acquisition may be acquired after the secondary battery is charged and discharged through a charging/discharging device. if the secondary battery is charged and discharged once, it may be defined that the secondary battery has passed one cycle. In some embodiments, whenever the secondary battery has passed about 100 cycles by the charging/discharging device, the first and second images may be acquired from the CT scanning device.

In some embodiments, the CT scanning device 107 may include a jig on which the secondary battery is mounted, an X-ray irradiator that irradiates X-rays to the secondary battery, an X-ray detector that detects the X-rays transmitted through the secondary battery, and a computer capable of acquiring the first and second images corresponding to the first and second areas of the secondary battery from the transmitted X-rays to store the first and second images. Finally, the first and second images acquired from the CT scanning device may be directly or indirectly transmitted to a control circuit 103 of the deformation analysis device 100 for the secondary battery.

In some embodiments, the charging and discharging device 108 may include a jig on which the secondary battery is mounted, a charging circuit connected to the secondary battery to provide charging power, a discharge circuit connected to the secondary battery to operate as a load, positive and negative electrode pins that connect the charging circuit or the discharging circuit to positive and negative electrode terminals of the secondary battery, respectively, and a computer capable of storing a charge/discharge time, a charge/discharge voltage, a charge/discharge current, and the number of times of a cycle. The number of times of the cycle that is finally acquired from the charging/discharging device may be directly or indirectly transmitted to the control circuit 103 of the deformation analysis device 100 for the secondary battery. In some embodiments, if the first and second images acquired from the CT scanning device 107 are transmitted to the control circuit 103 without intervention of the charging/discharging device 108, the number of times of the cycle may be also manually input through an input device.

[Measurement of Angle of Electrode and Determination of Deformation of Electrode]

If the first and second images are acquired through the CT scanning, an angle of an electrode (positive electrode or negative electrode) illustrated on the first and second images may be measured, and then whether the electrode is deformed may be determined. In some embodiments, if acquiring the first and second images, the number of times of charging/discharging cycle may also be acquired. In some embodiments, it may be determined whether the electrode is deformed according to the number of times of the cycle of the secondary battery.

In some embodiments, a first angle may be measured from a winding front end 30E to a winding distal end 30E of the electrode of the electrode assembly on the first image, and a second angle may be measured from the winding front end 30S to the winding distal end 30E of the electrode of the secondary battery on the second image (see FIG. 3*b*).

As described above, the electrode assembly 30 having a positive electrode plate 31, a separator 32, and a negative electrode plate 33, which are stacked, may be wound in a cylindrical shape. The winding front end 30S and the winding distal end 30E may be a winding front end 30S and a winding distal end 30E of the positive electrode plate 31 and may be a winding front end 30S and a winding distal end 30E of the negative electrode plate 32.

In some embodiments, a first angle θ may be an angle between a first straight line corresponding to a radius from the winding front end 30S, which is obtained from the first image, to a center of the electrode assembly and a second straight line corresponding to a radius from the winding distal end 30E to the center of the electrode assembly (see FIG. 3*b*).

In some embodiments, a second angle θ may be an angle between a first straight line corresponding to a radius from the winding front end 30S, which is obtained from the second image, to a center of the electrode assembly and a second straight line corresponding to a radius from the winding distal end 30E to the center of the electrode assembly (see FIG. 3*b*).

As described above, if a difference value between the first angle and the second angle is greater than a reference value, it may be determined that the electrode assembly is deformed. In some embodiments, the reference value may be between about 1° and about 20°, between about 5° and about 15°, or between about 8° and about 11°. The reference value may be variously changed according to electrochemical characteristics, a size, or use environments or conditions of the secondary battery.

In general, if the electrode of the electrode assembly is not deformed, there is no difference between the first angle acquired from the first image corresponding to the first area of the secondary battery and the second angle acquired from the second image corresponding to the second area of the secondary battery. However, as the number of times of the charging/discharging cycle of the secondary battery increases, the electrode assembly may be repeatedly expanded and contracted, and thus, a position of the winding front end 30S and the winding distal end 30E of the electrode assembly may be changed. Therefore, in view of this point, the present disclosure measures the first angle from the winding front end 30S of the electrode of the electrode assembly to the winding distal end 30E on the first image and the second angle from the winding front end 30S of the electrode of the electrode assembly to the winding distal end 30E on the second image, and then, if the difference value between the first angle and the second angle is greater than a predetermined reference value, it may be determined that the electrode assembly is deformed.

In some embodiments, if at least one of the first angle and the second angle according to the lapse of the number of times of the charging/discharging cycle of the secondary battery is greater than the reference value, it may be determined that the electrode assembly is deformed. In some embodiments, if the first angle obtained from the first image is accumulated and stored as the number of times of the charging/discharging cycles of the secondary battery elapses, the first angle accumulated and stored as described above is greater than the reference value (for example, about 1° to about 1°) in which the first angle is preset, and it may be determined that the electrode assembly is deformed. In some embodiments, if the second angle obtained from the second image is accumulated and stored as the number of times of the charging/discharging cycles of the secondary battery elapses, the second angle accumulated and stored as described above is greater than the reference value (for example, about 1° to about 1°) in which the first angle is preset, and it may be determined that the electrode assembly is deformed. In some embodiments, in embodiments of the present disclosure, whether the electrode assembly is deformed may be determined in consideration of the change in value of each of the first angle and the second angle as well as the difference in value between the first and second angles.

Figure 4:
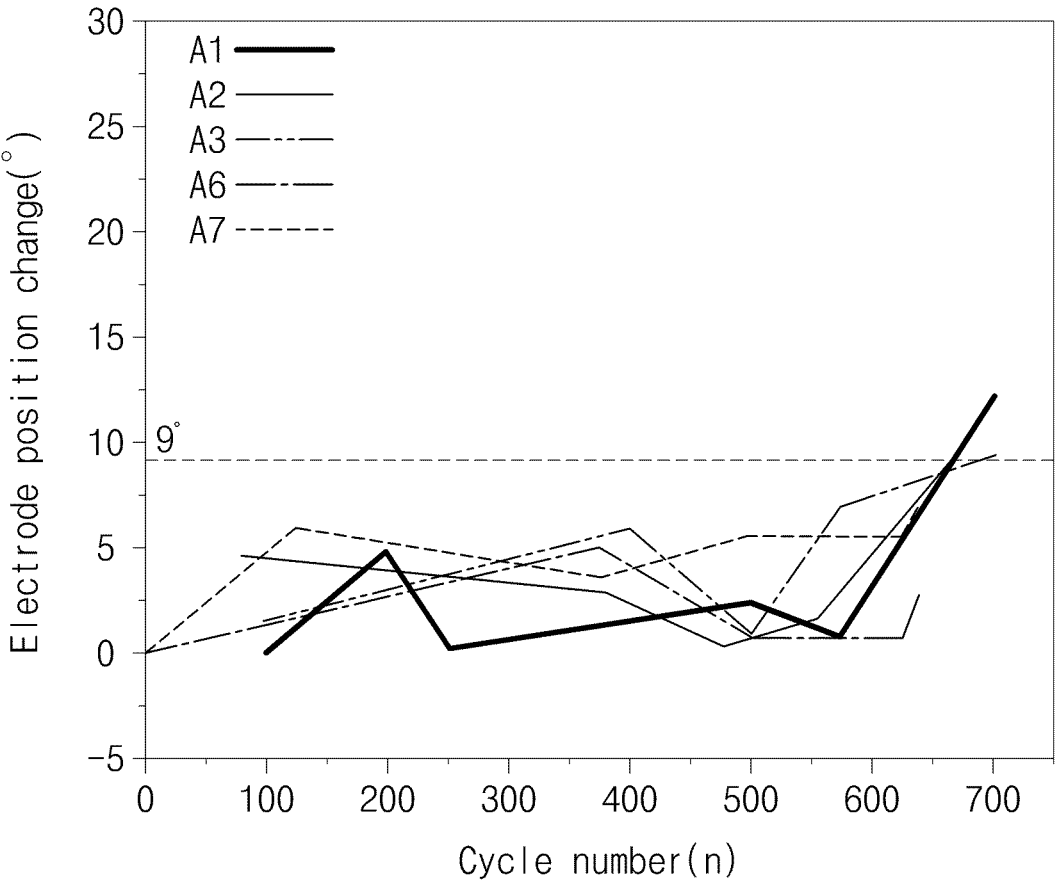
FIG. 4 is a graph illustrating a change in electrode position versus the number of times of changing/discharging cycles of a secondary battery.

FIG. 4 is a graph illustrating a change in electrode position versus the number of times of changing/discharging cycles of a secondary battery. In FIG. 4, an X axis is the number of times of a charging/discharging cycle, a Y axis is an electrode position change value (°), and reference symbols A1 to A7 are numbers of analyzed secondary batteries.

As illustrated in FIG. 4, it may be seen that a position change (e.g., an angle change) of the electrode generally increases as the number of times of the charging/discharging cycle increases. For example, as the number of times of the charging/discharging cycles elapses about 600 times, it may be seen that in a specific secondary battery, the angle change of the electrode increases to be higher than about 9°. As described above, if the angle change of the electrode is higher than about 9°, it may be determined that the electrode assembly is deformed inside the can.

As described above, according to the deformation analysis device and method for the secondary battery according to embodiments of the present disclosure, the first and second images spaced apart from each other in the direction perpendicular to the winding axis of the electrode assembly may be acquired, the first angle between the winding front end and the winding distal end on the first image may be measured, and whether the electrode assembly is deformed may be measured from the difference value between the first and second angles. Therefore, embodiments of the present disclosure enable accurate determination of whether the electrode assembly inside the secondary battery is deformed in a non-destructive manner and method without disassembling the secondary battery.

The present disclosure may provide the deformation analysis device and method for the secondary battery, which are capable of accurately diagnosing the electrode deformation of the secondary battery using the CT image, which is a non-destructive analysis method.

The above-mentioned embodiments are example embodiments for implementing the deformation analysis device and method for the secondary battery according to the present disclosure, and thus, the present disclosure is not limited to the foregoing embodiments. Moreover, it will be understood by those of ordinary skill in the art that various changes in form and details may be made therein without departing from the spirit and scope of the present disclosure as defined by the following claims.

Example embodiments have been disclosed herein, and although specific terms are employed, they are used and are to be interpreted in a generic and descriptive sense only and not for purpose of limitation.

What is claimed is:

1. A deformation analysis method for a secondary battery having an electrode assembly in a case, the deformation analysis method comprising:

performing computed tomography (CT) scanning on each of a first area and a second area of the secondary battery to acquire a first image corresponding to the first area and a second image corresponding to the second area;

measuring a first angle from a winding front end to a winding distal end of an electrode of an electrode assembly in the first image and measuring a second angle from the winding front end to the winding distal end of the electrode of the electrode assembly in the second image; and determining that the electrode assembly is deformed if a difference value between the first angle and the second angle is greater than a reference value.

2. The deformation analysis method as claimed in claim 1, wherein the secondary battery has a cylindrical shape.

3. The deformation analysis method as claimed in claim 1, wherein the electrode assembly has a positive electrode plate, a separator, and a negative electrode plate, in stacked configuration and is wound in a cylindrical shape.

4. The deformation analysis method as claimed in claim 3, wherein the winding front end and the winding distal end are a winding front end and a winding distal end of the positive electrode plate or a winding front end and a winding distal end of the negative electrode plate.

5. The deformation analysis method as claimed in claim 1, wherein the first and second areas are spaced apart from each other in a direction perpendicular to a winding axis of the electrode assembly.

6. The deformation analysis method as claimed in claim 1, wherein the first area comprises an upper area adjacent to an upper end of the secondary battery and the second area comprises a lower area adjacent to a lower end of the secondary battery.

7. The deformation analysis method as claimed in claim 1, wherein each of the first and second angles is an angle between a first straight line corresponding to a radius from the winding front end to a center of the electrode assembly and a second straight line corresponding to a radius from the winding distal end to the center of the electrode assembly.

8. The deformation analysis method as claimed in claim 1, wherein the reference value ranges from about 1° to about 20°.

9. The deformation analysis method as claimed in claim 1, wherein the method is repeated according to a number of times charge/discharge cycles of the secondary battery is performed.

10. The deformation analysis method as claimed in claim 1, further comprising determining that the electrode assembly is deformed if at least one of the first angle or the second angle is greater than the reference value as each charge/discharge cycle of the secondary battery elapses.

11. A deformation analysis device for a secondary battery, in which an electrode assembly is in a case, the deformation analysis device comprising:

a control circuit;

a processor installed in the control circuit; and a memory installed in the control circuit and operably connected to the processor, wherein the processor is configured to execute a program code stored in the memory so as to perform:

an operation of performing computed tomography (CT) scanning on each of a first area and a second area of the secondary battery to acquire a first image corresponding to the first area and a second image corresponding to the second area;

an operation of measuring a first angle from a winding front end to a winding distal end of an electrode of an electrode assembly in the first image and measuring a second angle from the winding front end to the winding distal end of the electrode of the electrode assembly in the second image; and an operation of determining that the electrode assembly is deformed if a difference value between the first angle and the second angle is greater than a reference value.

12. The deformation analysis device as claimed in claim 11, wherein the secondary battery has a cylindrical shape.

13. The deformation analysis device as claimed in claim 11, wherein the electrode assembly has a positive electrode plate, a separator, and a negative electrode plate, in stacked configuration and is wound in a cylindrical shape.

14. The deformation analysis device as claimed in claim 13, wherein the winding front end and the winding distal end are a winding front end and a winding distal end of the positive electrode plate or a winding front end and a winding distal end of the negative electrode plate.

15. The deformation analysis device as claimed in claim 11, wherein the first and second areas are spaced apart from each other in a direction perpendicular to a winding axis of the electrode assembly.

16. The deformation analysis device as claimed in claim 11, wherein the first area comprises an upper area adjacent to an upper end of the secondary battery and the second area comprises a lower area adjacent to a lower end of the secondary battery.

17. The deformation analysis device as claimed in claim 11, wherein each of the first and second angles is an angle between a first straight line corresponding to a radius from the winding front end to a center of the electrode assembly and a second straight line corresponding to a radius from the winding distal end to the center of the electrode assembly.

18. The deformation analysis device as claimed in claim 11, wherein the reference value ranges from about 1° to about 20°.

19. The deformation analysis device as claimed in claim 11, wherein the method is repeated according to a number of times charge/discharge cycles of the secondary battery is performed.

20. The deformation analysis device as claimed in claim 11, further comprising an operation of determining that the electrode assembly is deformed if at least one of the first angle or the second angle is greater than the reference value as each charge/discharge cycle of the secondary battery elapses.

* * * * *